H. JUNG.
MACHINE REAMER.
APPLICATION FILED DEC. 15, 1919.
1,366,733.
Patented Jan. 25, 1921.
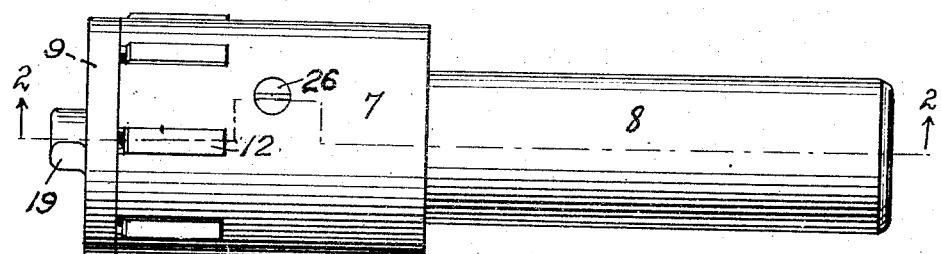
Fig. 1.
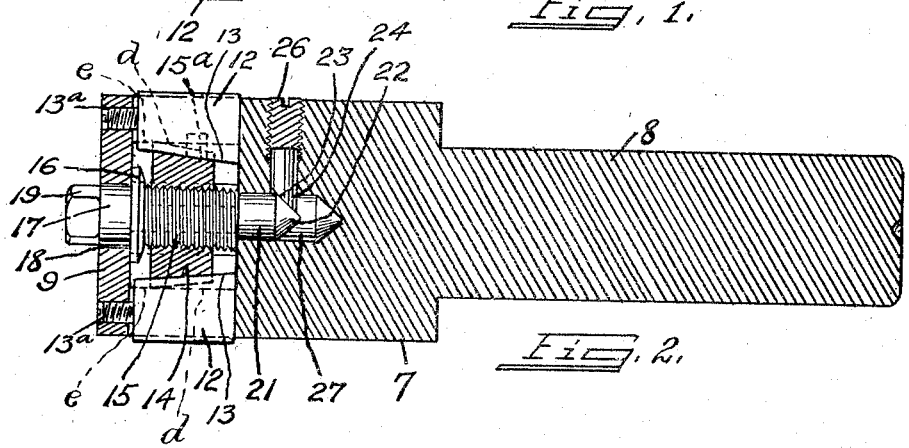
Fig. 2.
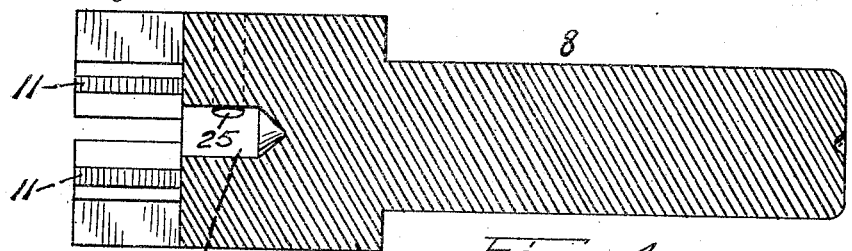
Fig. 4.
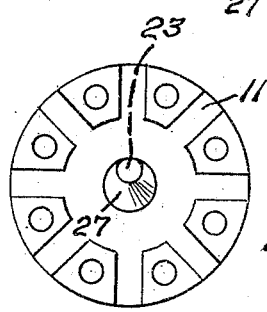
Fig. 5.
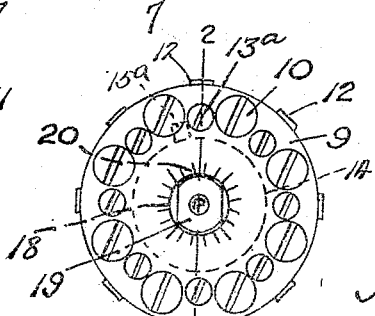
Fig. 3.
Fig. 6.
Inventor:
Henry Jung,
By John Elias Jones,
Attorney.

UNITED STATES PATENT OFFICE.

HENRY JUNG, OF NORWOOD, OHIO.

MACHINE-REAMER.

1,366,733.  Specification of Letters Patent.  Patented Jan. 25, 1921.

Application filed December 15, 1919. Serial No. 344,866.

*To all whom it may concern:*

Be it known that I, HENRY JUNG, an alien German and a resident of Norwood, in the county of Hamilton and State of Ohio, have invented certain new and useful Improvements in Machine-Reamers, of which the following is a specification.

This invention relates to machine-reamers and more especially to an improvement in the reamer for which United States Letters-Patent No. 1,324,553 were granted me under date December 9, 1919, and its object is to materially simplify and cheapen the structure shown and described in the said patent, especially in connection with the means employed for expanding the cutters radially for variations in cuts or boring operations.

In the accompanying sheet of drawings, Figure 1 is a longitudinal elevation of the complete device embodying my invention herein ready for use; Fig. 2, an axial longitudinal section, taken on dotted line 2, 2, of Figs. 1 and 3, showing the cutter-blades slightly extended; Fig. 3, a fore-end elevation of Fig. 1; Fig. 4, an axial section of the single-piece reamer head and shank featuring an important part of the invention, the same omitting all but the head and shank; Fig. 5, a fore-end view of Fig. 4; and Fig. 6, a perspective view of one of the cutter-blades.

7 indicates the head and 8 the reduced extended-end or shank thereof, a cap-plate or disk 9 being removably-secured by means of countersunk screws 10 to the outer fore-end of the said head (as best shown in Fig. 2). In Fig. 4 is best shown how the head and shank are preferably constructed integral or of one piece of metal to reduce labor on and looseness of the two parts or members of the device in its manufacture and use, respectively, as well as consequent reduced cost.

The said fore-end of the head 7 is provided with a circumferential series of longitudinal open slots or seats 11, as best seen in Fig. 5, to accommodate the cutter-blades 12 that fit snugly but free to be adjusted radially, as well as longitudinally, in the head, to suit the desired boring or reaming to be done.

The cutter-blades 12 are each of the outline shown in Fig. 6, the same as in said former patent, and have a sloping inner edge 13 that tends toward the said fore-end of the head when they are placed in their slots or seats 11.

Each cutter-blade has a longitudinally-acting abutting headless screw $13^a$ in the cap-plate 9 whereby it is held firmly in its slot or seat 11 against moving out of circumferential alinement with its fellow cutter-blades, the same as in the said former patent.

To adjust the cutter-blades radially in their slots or seats 11, for providing for various diameters of openings to be reamed or bored, I provide an axial conical traveler or spreader 14, internally screw-threaded and sloping downwardly toward the rear of the head 7 to contact with the forwardly-sloping inner edges 13 of the blades, as best shown in Fig. 2, and I further provide an axial screw shaft or arbor 15 that engages the threaded bore of the said conical traveler 14 to propel or reciprocate the latter along the slotted interior of the fore-end of the head. The traveler 14 is kept from turning or rotating by means of a pin $15^a$ that projects radially therefrom (Fig. 2) in the space or guide-way between any pair of cutter-blades, also as in said former patent, but the conical spreader of that patent is smooth-bored and has an outwardly-threaded forward-extension not found in the spreader herein, which greatly simplifies this spreader and reduces its cost, both clearly obvious.

The propelling screw-surface of the shaft or arbor 15 has a flange 16 that contacts with the inner face of the cap-plate 9 when the latter is secured in place; and an integral outward-extension 17 has a rotary bearing 18 in the center of the cap-plate. The extension 17 is tipped by a flat-faced projection 19 extending beyond the outer face of the cap-plate for the engagement of a wrench or pliers in turning the screw-shaft 15, which, in turn, advances the conical traveler or spreader 14 for extending the cutter-blades diametrically or radially beyond the face of the head 7 or permits their retreat to suit the desired bore or degree of cut to be made in the reaming operations of the tool. On the outer face of the cap-plate, surrounding its central opening 18, I provide radial graduations 20 to guide the user when adjusting the conical-spreader in connection with the cutter-blades.

At the inner end of the screw-threaded shaft or arbor 15 I provide an axial pilot-extension 21, conically tipped at 22, at forty-five degrees, more or less, and which forms a thrust-bearing in contact with the lower or inner beveled end 23 of a pin 24 (Fig. 2) that is freely seated in a radial hole or guideway 25 made in the head 7 to the rear of the open slots or cutter seats 11 and has a capping or securing screw 26 that engages the outer threaded-portion of the said hole 25. The outer face of screw 26 lies flush with the outer face of the reamer-head so as not to interfere with the use of the tool.

An opening or guide-way 27 is provided axially in the reamer-head to furnish a snug bearing for the extended, inner pilot-end 21, the central hole 18 of the cap-plate also furnishing a snug bearing for the smooth part 17 of the screw-shaft 15 to assure the proper radial adjustment of the cutter-blades and to prevent any looseness, play or rattle of the several parts of the tool whereby it might become defective.

The beveled pin 24 permits the arbor 15 to turn but not to move inwardly, whereby the flange 16 of said arbor is held in due contact with the inner face of the cap-plate and no force on the outer end 19 permitted to cause the spreader to move further inwardly to affect the relative extent to which the cutter-blades are disposed beyond the peripheral face of the reamer-head.

I claim:—

In a machine-reamer, a cutter-head having radial cutter-blade seat-ways, a shank, radially-mounted blades in said seat-ways, said blades having sloping inner edges, a removable cap-plate, a screw shaft or arbor having a bearing at its outer portion in the cap-plate and at its inner portion in a bearing-hole within the head, an internally-threaded conical traveler or spreader mounted on the said shaft or arbor free to be reciprocated along and by the latter in contact with the sloped inner edges of said cutter-blades, a pin projecting from the face of said spreader between the inner edges of any pair of the said cutter-blades to prevent rotation of the spreader, a longitudinally-acting detent-flange on the arbor, an inner tapered-extension on the arbor, a radial pin in the head whose inner tapered end is adapted to thrustingly-engage the said tapered extension of the arbor, and a screw-stop for the said radial pin in the head.

HENRY JUNG.